July 11, 1972   J. SCHAETTI   3,676,269
METHOD OF AND APPARATUS FOR COATING FABRICS
Filed Sept. 4, 1969   2 Sheets-Sheet 1

INVENTORS
Josef Schaetti
BY Sherman & Shalloway
ATTORNEYS

July 11, 1972  J. SCHAETTI  3,676,269

METHOD OF AND APPARATUS FOR COATING FABRICS

Filed Sept. 4, 1969  2 Sheets-Sheet 2

INVENTORS
JOSEF SCHAETTI

BY Sherman & Shalloway
ATTORNEYS

United States Patent Office 3,676,269
Patented July 11, 1972

3,676,269
METHOD OF AND APPARATUS FOR COATING FABRICS
Josef Schaetti, 5 Gartenheimstrasse,
8304 Wallisellen, Switzerland
Filed Sept. 4, 1969, Ser. No. 855,236
Int. Cl. B32b 31/08, 31/12
U.S. Cl. 156—548                     10 Claims

ABSTRACT OF THE DISCLOSURE

Method and apparatus for applying coatings of thermoplastic or thermosetting resins in a predetermined pattern on one face of a traveling web. The apparatus includes a hollow rotating drum which is perforated in a desired pattern and into which is metered the resin to be applied to the traveling web. The web is held in engagement with the outer periphery of the rotating drum by a traveling belt or any other convenient arrangement which can assure passage of the web in contact with the drum at the same speed as the peripheral speed of the drum. Located interior of the drum is a baffle structure which limits the movement in response to rotation of the drum of the resin and assures that the coating of resin applied to the web through the holes in the drum is of constant thickness. After the web leaves its engagement with the rotating drum, the powdered resin is heated to cause it to sinter and to adhere to the web.

---

The present invention relates to a method of and apparatus for applying coating, in accordance with a pre-determined pattern on an elongated web of fabric.

Applying a resin coating to an elongated web of fabric in accordance with a pre-determined pattern is known. The coating, which may for example be in the form of spots, can, however, only be produced with PVC pastes. The adhesive powers of a polyvinylchloride coating of this kind on being ironed in leave much to be desired and are not sufficiently resistant when the finished article is cleaned with perchloroethylene or trichloroethylene. Coatings with other resins are also known with the resin being applied to the fabric with an irregular distribution by sprinkling. It, is impossible, however, to form a regular pattern; and, thus, there is too much resin in some places while there is not enough in others. The result is that in the places with an excessively thick coating, the ironed fabric becomes too hard and in other places the adhesion is not good. Only a stiffening material with an evenly distributed coating gives a finished product with even adhesive properties. Examples of materials for interlining with a coating include cotton and synthetic materials as well as hair interlinings and horsehair cloth which can be coated in order to stiffen a top cloth. Other fabric webs such as non-woven fabrics, felts, foam materials, sheeting, carpets and tapestries, can also be coated with resin. These materials for ironing in, or interlining materials, are used mainly in the ready-made clothing industry and in the shirt industry.

According to one aspect of the present invention, there is provided a method of applying a coating of thermoplastic or thermosetting resin distributed in accordance with a pre-determined pattern on an elongated web of fabric, comprising the steps of longitudinally feeding the fabric past the underside of a hollow drum having a cylindrical surface portion perforated in accordance with the pattern, maintaining an area of the traveling fabric in direct substantially slipless contact with a downward facing portion of the cylindrical surface of the drum, introducing the resin in the form of a dry powder into the interior of the drum at a rate such that the level of the powder within the drum remains below the level at which the traveling web comes into contact with the downward facing portion so that the traveling web leaving the roll carries powder only in the descrete piles according to the pattern of the perforated surface portion, and finally heating the piles to cause them to sinter and to adhere to the web of fabric.

According to another aspect of the present invention, there is provided apparatus for carrying out the above method of applying a coating of thermoplastic or thermosetting resin distributed in accordance with a pre-determined pattern on to an elongated web of fabric, comprising a hollow rotatable drum having a cylindrical surface portion perforated in accordance with the pattern, two lower rolls supporting the drum and an upper roll urging the drum towards the supporting rolls, means for feeding a powder into the drum at a controllable rate and stripping means arranged within the drum in the vicinity of the lower rolls forming a wall defining one end of a pool of the powder and preventing the powder being carried upward in the interior of the drum, the arrangement being such that between the lines of contact between drum and each of the two supporting rolls there is an interior portion of the drum which in use carries coating material in powder form. The apparatus may include an endless conveyor belt which passes between the drum and the two supporting rollers and conveys the elongated web of fabric past the underside of the drum, means for heating at least the coated side of the web of fabric issuing from the underside of the drum, two calender rolls for pressing the heated coating, and means for feeding a covering web of material between the coated side of the fabric and one of the two calender rolls. The stripping means may include a resilient blade, mounted in such a manner that a free edge of the blade presses against the interior of the drum and is pointed in a direction opposite to the direction of the rotation of the drum when in use and a holder retaining the resilient blade and one end plate each contiguous with one lateral edge of the blade and closely adjacent to the interior of the cylindrical surface of the drum, which in use substantially hinder the powder escaping at the sides of the interior portion. Advantageously, the resilient blade has a thickness not exceeding 0.02 inch and the stripping means is adjustably mounted in such a manner that the free edge of the blade presses against the interior of the drum along a line which is settable relative to the region in which the fabric leaves contact with the downward facing portion of the drum.

According to yet another aspect of the present invention, there is also provided a web of fabric, when coated with thermoplastic or thermosetting resin by the method of the invention.

Examples of the method and apparatus of the invention will now be more particularly described with reference to the accompanying drawings, in which:

FIG. 5 illustrates a modification of the arrangement shown in FIG. 1 on a smaller scale.

Figure 1:
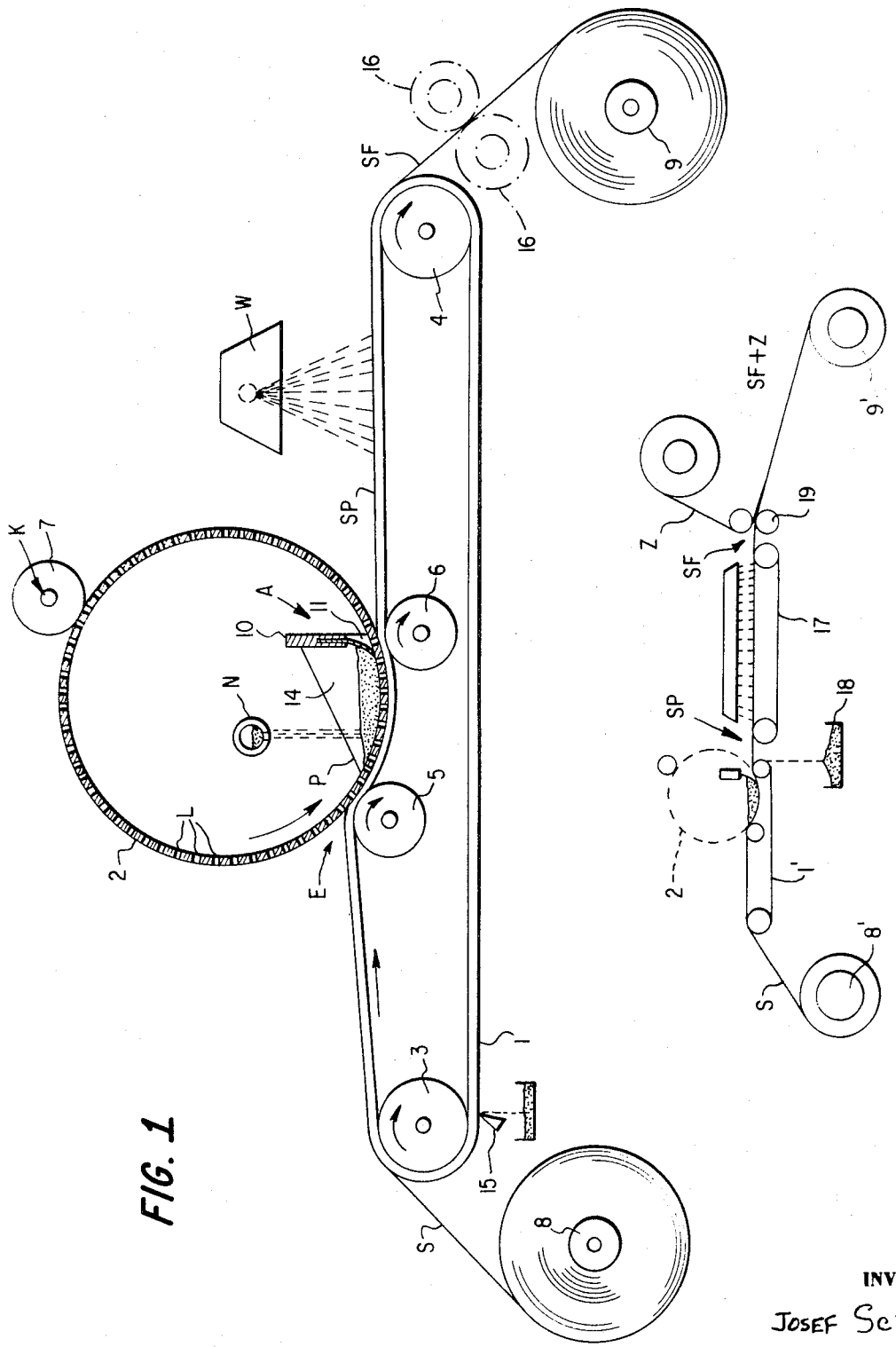
FIG. 1 illustrates diagrammatically a coating arrangement embodying the invention.

Referring now to the drawings, the apparatus includes a mechanically driven endless conveyor belt 1 which drives a perforated, hollow cylindrical drum 2 resting on it. The conveyor belt is driven by a front pulley 3 and is guided around a rear guide pulley 4. The hollow cylindrical drum 2 rests on two supporting rolls 5 and 6 disposed within the conveyor belt stringers and is pressed onto the belt with a force K by an upper pressure roll 7 which is flexibly and rotatably mounted. For the sake of clarity, all the bearings of the drum, pulleys and rolls have been omitted in FIG. 1. The perforated hollow cylindrical drum comprises a cylindrical metal shell perforated in accordance with a definite pattern; it has no distinct axle but rather rotates between the three rolls 5, 6 and 7.

The web of fabric S to be coated is wound on a supply roll 8, rests on the top stringer of the conveyor belt 1 and is passed by the conveyor belt through the device to the finished material roll 9. The finished product is indicated by SF.

In the interior of the hollow cylindrical roll 2, there is a certain quantity or pool of resin P in powder form, a stripping device A and a powder feed device N. The striping device A assists in confining the powder P to the web of fabric S to be coated in a manner corresponding to the perforations and forms a wall defining one end of the pool P. It is desirable that the stripping device A strips the powder P from the inside wall of the hollow cylindrical roll so thoroughly, that no powder is carried up past the stripping device.

The stripping device is shown in perspective in FIG .3 and its action is explained with reference to FIG. 2. The stripping device includes a holder 10 in which is clamped a thin blade of sheet steel 11. In FIG. 3, the cylindrical inside wall of the drum is indicated by dash-dot lines 2'. The sheet steel blade 11 is as thin as a razor blade. Good results are obtained with a blade of sheet steel 0.02 inch thick, for example. In the operational state, the steel blade 11 rests on the inside wall of the hollow cylindrical roll with a certain pressure and is then curved in opposition to the direction of rotation of the drum. In the unloaded state, the steel blade is straight. The ends 12 of the holder 10 are guided laterally so that the holder can move upwards and downwards. Tension springs (not illustrated) are attached to pins 13 and determine exactly the bearing pressure of the steel blade on the inside wall of the drum. For best results, the inside wall of the hollow cylindrical drum must be perfectly smooth. End plates 14 are fixed to the holder 10 at the sides, adjacent to the ends of the sheet steel blade 11, to keep the powder together at the sides. The lower edge 14' of these side plates is matched to the radius of curvature of the inside wall of the drum.

In FIG. 1, a heat radiator W is fitted behind the hollow cylindrical drum 2 in the direction of movement of the web of fabric. If the hollow cylindrical drum 2 is perforated over a greater width than the width of the fabric web S to be coated, powder gets on to the conveyor belt beside the fabric web as well. As a result of the heating effect of the heat radiator W, this surplus powder adheres to edge portions of the conveyor belt 1. The adhering powder is scraped off the conveyor belt continuously by means of a scraper device 15.

In operation, the conveyor belt 1 draws the fabric web S continuously from the supply roll 8 and conveys it under the lower side of the hollow cylindrical drum 2 and through. In this process, the drum 2 rolls on the fabric web without slip. The front supporting roll 5 is disposed somewhat higher than the rear roll 6. In this way a kind of trough is formed between the entry line E (FIG. 1) and the stripping device A, in the region of which the fabric web S seals the perforation pattern L (FIGS. 1 and 2) on the outer side of the drum 2. Hence, it is possible to fill this trough with resin in powder form P for the coating process.

Figure 2:
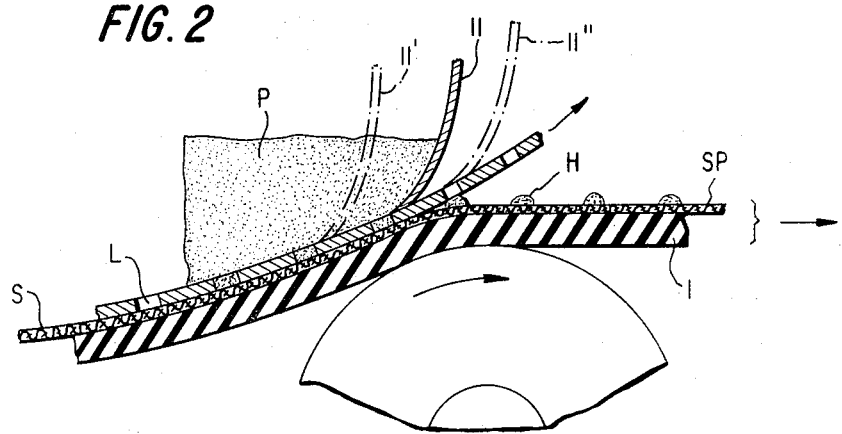
FIG. 2 illustrates to a larger scale a detail of the arrangement shown in FIG. 1.
Figure 3:
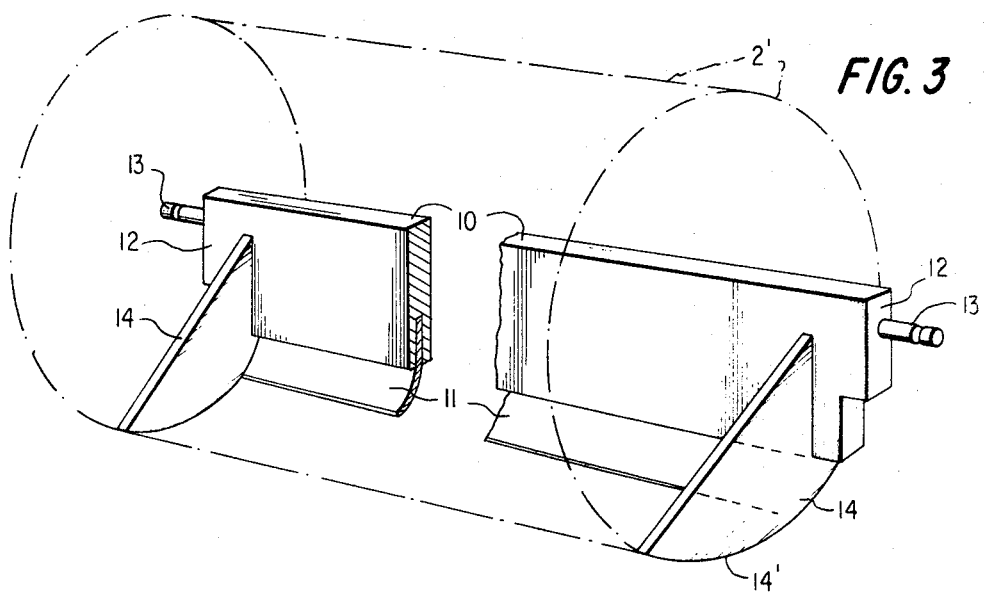
FIG. 3 illustrates a stripping device, such as may be included in a coating arrangement as shown in FIG. 1, on a larger scale and in perspective views.
Figure 4A:
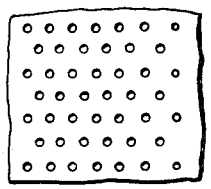
FIGS. 4a, 4b and 4c show some types of perforation of the drum shown in FIG. 1.
Figure 4B:
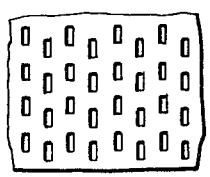
Figure 4C:
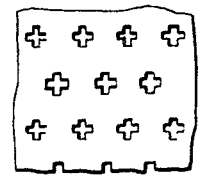

If the metal blade 11 is in the position shown in solid lines in FIG. 2, all the holes L in the region of the powder charge are filled with powder and the holes situated behind the steel blade 11 have transferred their contents on to the web of fabric SP in small piles H which remain thereon in the arrangement of the chosen pattern of holes. FIGS. 4a, 4b and 4c show some possible perforation patterns for the drum. The little piles of powder H thus produced on the section of fabric web SP then pass under the heat radiator W where they are sintered and adhere to the fabric web. Behind the heat radiator, the finished fabric web is marked SF. It is wound on to the finished material roll 9.

If desired, the coating applied to the fabric web SF can also be pressed on. For this, the already sintered piles of powder H are pressed on to the fabric web by means of two calender rolls 16 which are indicated by dash-dot lines.

If the stripping device is so adjusted that the metal blade 11 comes into the position 11' (FIG. 2), the result is that the piles of powder H contain less powder, while an adjustment into the position 11" causes them to contain more powder. If the fabric web is being coated with thermosetting resin care must be taken that the resin is only heated to such a degree that it remains in the A-stage of hardening.

FIG. 5 illustrates a modification of the apparatus illustrated in FIG. 1. The conveyor belt 1' carries the fabric web S only as far as the hollow cylindrical drum 2 and is guided back at that point. The fabric web which has been coated with powder SP runs freely for a certain distance up to a second conveyor belt 17 where the little piles of powder are heated. As a result of this measure, any excess powder which has got on to the conveyor belt 1' at the side of the fabric web trickles straight off the end of the belt into a collecting receptacle 18 and can be used again. Another difference from the apparatus in FIG. 1, is that directly behind the second conveyor belt 17, there are two rolls 19, by means of which a second fabric web, a top cloth Z, is pressed on to the coating of the finished interlining fabric web SF while this coating is still soft and capable of adhesion. The fabric webs SF+Z which have thus been joined together are wound on to a finished material roll 9'.

The manufacturing process embodying the invention is intended to apply coatings to a web of interlining material in accordance with pre-determined patterns and employs dry powder as a starting material. This makes it possible to dispense with the very time-consuming, dirty and health-endangering process of cleaning the equipment required with machines operating with a polyvinylchloride paste as the starting material. If the starting material is in powder form, it is possible to operate with not only polyvinyl chloride but also other thermoplastic, or even thermosetting resins such as polyethylene, cellulose acetate, polyamide, epoxy resins and polyvinyl acetate. The interlining materials produced with these substances have better and more uniform adhesion and have better resistance to the cleaning agents perchloroethylene and trichloroethylene.

What I claim is:

1. A method of applying a coating of thermoplastic or thermosetting resin distributed in accordance with a pre-determined pattern onto an elongated web of fabric, comprising the steps of longitudinally feeding the fabric past the underside of a hollow rotatable drum having a cylindrical surface portion perforated in accordance with the pattern, maintaining an area of the traveling fabric in direct and substantially slip-less contact with a downward-facing portion of the cylindrical surface of the drum, introducing the resin in the form of a dry powder into the interior of the drum at a rate to provide a pool of the powder within the drum having a level below the level at which the traveling web comes into contact with the downward-facing portion, preventing powder rising in the interior of the cylindrical surface of the drum above the region in which the fabric leaves contact with the downward-facing portion by providing stripping means forming a wall defining one end of the pool so that the traveling web leaving the roll carries powder only in discrete piles according to the pattern of the perforated surface portion, and finally heating the piles to cause them to sinter and to adhere to the web of fabric.

2. Apparatus for coating fabrics with thermoplastic or thermosetting resins in a predetermined pattern comprising a hollow rotatable drum having a cylindrical surface portion perforated in accordance with the pattern, two lower rolls supporting said drum and an upper roll urging said drum towards said lower rolls, means for feeding the resin in the form of a powder into said drum to provide a pool of powder in said drum, and stripping means forming a wall defining one end of said pool, said stripping means arranged within said drum in the vicinity of one of said lower rolls for preventing the powder being carried upward in the interior of said drum, the area of contact between said drum and said lower rolls defining an interior portion of said drum receiving said pool of powder.

3. Apparatus as defined in claim 2 and further comprising an endless conveyor belt passing between said drum and said lower rollers and conveying an elongated web of fabric past the underside of said drum.

4. Apparatus as defined in claim 3, wherein said endless conveyor belt extends in the direction of travel of the web of fabric only as far as said one lower roll in the vicinity of said stripping means and further comprising take-up means for the web of fabric whereby the web of fabric carrying piles of powder from said drum is guided freely to said take-up means such that any powder deposited on said endless conveyor belt may drop off beyond said one lower roll.

5. Apparatus as defined in claim 3 and further comprising means for heating at least the coated side of the web of fabric issuing from the underside of said drum, two calender rolls for pressing the heated coating, and means for feeding a covering web of material between the coated side of the web of fabric and one of said two calender rolls.

6. Apparatus as defined in claim 3 wherein said stripping means includes a resilient blade having a free edge and being mounted such that said free edge and being said blade presses against the interior of said drum and is pointed in a direction opposite to the direction of rotation of said drum when in use.

7. Apparatus as defined in claim 6, wherein said stripping means includes a holder retaining said resilient blade and end plates each contiguous with one lateral edge of said blade and closely adjacent to the interior of the cylindrical surface of said drum to substantially hinder the powder escaping at the sides of said interior portion.

8. Apparatus as defined in claim 6 wherein said resiliest blade has a thickness not exceeding 0.02 inch.

9. Apparatus as defined in claim 6, wherein said stripping means is adjustably mounted in such a manner that said free edge of said blade presses against the interior of said drum along a line which is settable relative to the region in which the web of fabric leaves contact with the downward facing portion of said drum.

10. Apparatus as defined in claim 2 wherein said one of said lower rolls is disposed lower than the other of said lower rolls.

References Cited

UNITED STATES PATENTS

| | | | |
|---|---|---|---|
| 1,739,264 | 12/1929 | Simpson | 101—116 |
| 2,276,181 | 3/1942 | Foster | 101—116 |
| 3,002,849 | 10/1961 | Harmon et al. | 156—291 X |
| 3,033,721 | 5/1962 | Kalwaites | 156—291 X |

BENJAMIN A. BORCHELT, Primary Examiner

J. M. HANLEY, Assistant Examiner

U.S. Cl. X.R.

156—283, 291, 320

UNITED STATES PATENT OFFICE
CERTIFICATE OF CORRECTION

Patent No. 3,676,269                     Dated  July 11, 1972

Inventor(s) JOSEF SCHAETTI

It is certified that error appears in the above-identified patent and that said Letters Patent are hereby corrected as shown below:

Page 1, in the heading after the filing date and serial no. please insert the following:

Foreign Application Priority Data
September 24, 1968  Switzerland..................144457/68

Signed and sealed this 20th day of February 1973.

(SEAL)
Attest:

EDWARD M. FLETCHER, JR.                  ROBERT GOTTSCHALK
Attesting Officer                        Commissioner of Patents